United States Patent
Miyajima

(10) Patent No.: US 10,401,770 B2
(45) Date of Patent: Sep. 3, 2019

(54) DISCRIMINATING DEVICE AND IMAGE FORMING APPARATUS

(71) Applicant: CANON KABUSHIKI KAISHA, Tokyo (JP)

(72) Inventor: Yu Miyajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/976,278

(22) Filed: May 10, 2018

(65) Prior Publication Data
US 2018/0329348 A1    Nov. 15, 2018

(30) Foreign Application Priority Data
May 10, 2017    (JP) .................... 2017-093752

(51) Int. Cl.
*G02B 17/00* (2006.01)
*G03G 15/00* (2006.01)

(52) U.S. Cl.
CPC .......... *G03G 15/5029* (2013.01); *G02B 17/00* (2013.01)

(58) Field of Classification Search
CPC ....... G03G 15/5029; G03G 2215/00772; B41J 11/009
See application file for complete search history.

(56) References Cited

U.S. PATENT DOCUMENTS

| 6,838,687 B2 * | 1/2005 | Tullis ................. B41J 11/0095 250/559.07 |
| 7,821,639 B2 * | 10/2010 | Ehbets .................. G01J 3/02 235/462.04 |
| 8,922,764 B2 * | 12/2014 | Urano ................ G01N 21/9501 356/237.1 |
| 10,012,938 B2 | 7/2018 | Miyajima |
| 2010/0259772 A1 | 10/2010 | Ebihara et al. |
| 2013/0308008 A1 * | 11/2013 | Funatsu ............ H01L 27/14609 348/222.1 |
| 2014/0376065 A1 * | 12/2014 | Okamoto ........... H04N 1/00989 358/475 |
| 2016/0202393 A1 | 7/2016 | Saiga et al. |
| 2017/0276933 A1 | 9/2017 | Sumida et al. |

FOREIGN PATENT DOCUMENTS

| JP | 2010-283670 A | 12/2010 |
| JP | 2012-181555 A | 9/2012 |

* cited by examiner

*Primary Examiner* — Maurice C Smith
(74) *Attorney, Agent, or Firm* — Carter, DeLuca & Farrell LLP

(57) ABSTRACT

In order to provide a discriminating device in which high discrimination accuracy is achieved by appropriately setting parallelism of a plurality of light beams caused to enter a recording material, provided is a discriminating device including: a light guiding member configured to guide a plurality of light beams from a light source to an irradiated surface; an image pickup element configured to receive a light beam from the irradiated surface; and an optical system configured to guide the light beam from the irradiated surface to the image pickup element, wherein the plurality of light beams include a plurality of first light beams which are emitted from the light guiding member and enter a first effective region of the irradiated surface, and wherein the plurality of first light beams form an angle of 7° or less with each other within a first cross section parallel to the irradiated surface.

17 Claims, 9 Drawing Sheets

DISCRIMINATING DEVICE AND IMAGE FORMING APPARATUS

BACKGROUND OF THE INVENTION

Field of the Invention

The present invention relates to a discriminating device, and more particularly, to a discriminating device suitable as a device configured to discriminate the type of a recording material, which is mounted on an image forming apparatus such as a laser beam printer (LBP), a digital copying machine, and a multi-function printer (MFP).

Description of the Related Art

In recent years, in an image forming apparatus, in order to determine image forming conditions in accordance with the type of a recording material, there has been adopted a discriminating device configured to discriminate the type of a recording material.

In Japanese Patent Application Laid-Open No. 2010-283670, there is disclosed a discriminating device configured to discriminate the type of a recording material by causing a plurality of light beams to enter the recording material from directions different from each other and analyzing the scattered light beams.

However, in Japanese Patent Application Laid-Open No. 2010-283670, there are no consideration on the influence of parallelism of the plurality of light beams caused to enter the recording material on discrimination accuracy.

SUMMARY OF THE INVENTION

In view of the foregoing, it is an object of the present invention to provide a discriminating device in which high discrimination accuracy is achieved by appropriately setting parallelism of a plurality of light beams caused to enter a recording material.

According to one embodiment of the present invention, there is provided a discriminating device including: a light guiding member configured to guide a plurality of light beams from a light source to an irradiated surface; an image pickup element configured to receive a light beam from the irradiated surface; and an optical system configured to guide the light beam from the irradiated surface to the image pickup element, wherein the plurality of light beams include a plurality of first light beams which are emitted from the light guiding member and enter a first effective region of the irradiated surface, and wherein the plurality of first light beams form an angle of 7° or less with each other within a first cross section parallel to the irradiated surface.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, a discriminating device according to embodiments of the present invention is described with reference to the drawings. The drawings to be referred to below may not be drawn to scale in order to facilitate understanding of the embodiments.

[First Embodiment]

Figure 1A:
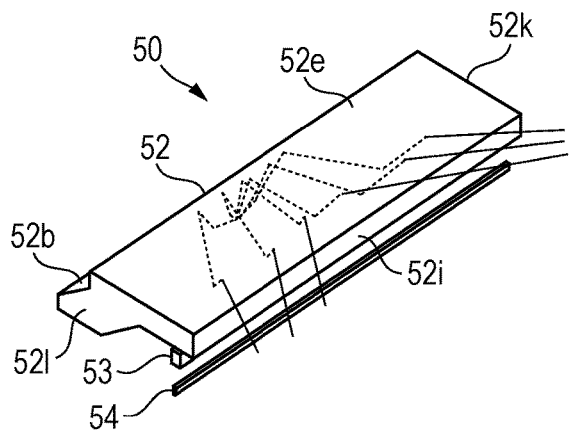
FIG. 1A is a perspective view of main portions of a discriminating device according to a first embodiment of the present invention.
Figure 1B:
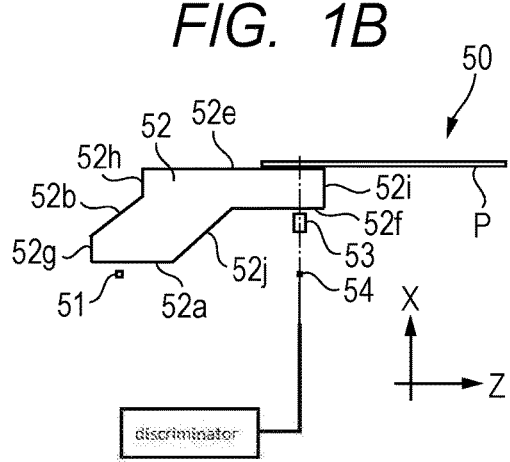
FIG. 1B is a side view of the main portions of the discriminating device according to the first embodiment.
Figure 1C:
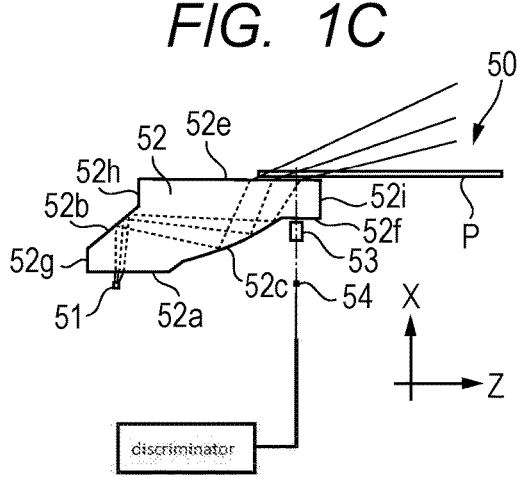
FIG. 1C is a sectional view of the main portions of the discriminating device according to the first embodiment taken along a position of Y=−4 mm.

FIG. 1A, FIG. 1B, and FIG. 1C are a perspective view of main portions of a discriminating device 50 according to a first embodiment of the present invention, a side view of the main portions, and a sectional view of the main portions taken along a position of Y=−4 mm, respectively.

Figure 1D:
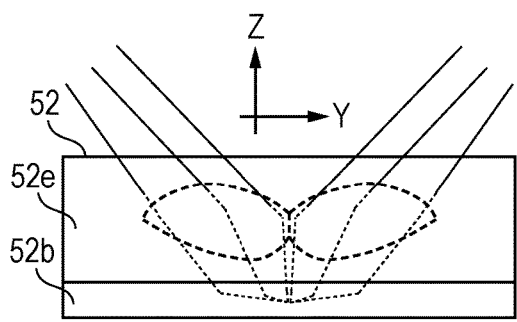
FIG. 1D is a top view of a light guiding member included in the discriminating device according to the first embodiment.
Figure 1E:
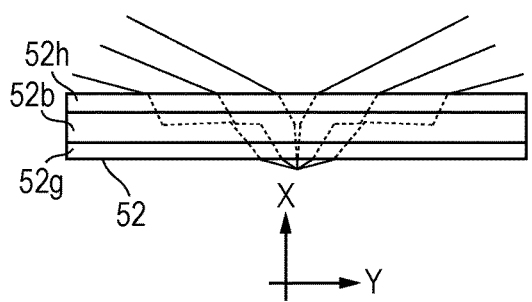
FIG. 1E is a rear view of the light guiding member included in the discriminating device according to the first embodiment.

Further, FIG. 1D and FIG. 1E are a top view and a rear view of a light guiding member 52 included in the discriminating device 50 according to the first embodiment, respectively.

In FIG. 1A to FIG. 1E, the dotted lines and the solid lines each represent parts of light beams traveling inside and outside of the light guiding member 52.

The discriminating device 50 according to the first embodiment includes a light source 51, the light guiding member 52, an imaging element 53, and a light receiving element 54.

The light source 51 is a green LED including a light emitter of 0.18 mm×0.18 mm, which is generally called a top view type light source, and is configured to emit light beams in a radial manner from its light emitting surface, with a surface normal direction to the light emitting surface being an optical axis. The light source 51 being the green LED has light distribution intensity characteristics (Lambert distribution) in which the light amount in the surface normal direction to the light emitting surface is the maximum, and the light amount gradually decreases as the tilt of the light beams from the surface normal increases.

The light guiding member 52 is an optical element formed of a resin (Zeonex E48R). The light guiding member 52 includes an incident surface 52a, a reflection surface 52b, a left side curved reflection surface (reflection surface, first curved surface) 52c, a right side curved reflection surface (reflection surface, second curved surface) 52d (not shown), an exit surface 52e, and a scattered light exit surface 52f.

Selfoc (trademark) Lens Array (SLA) is used as the imaging element (optical system) 53.

The light receiving element (image pickup element) 54 has a configuration in which photoelectric conversion elements such as a plurality of Si photodiodes are arranged in an array in a direction (first direction) perpendicular to a conveyance direction of a recording material P within a first cross section parallel to the recording material P (irradiated surface). The light receiving element 54 has a size of one pixel of 42.3 μm in order to be adaptable to a resolution of 600 dpi.

In the discriminating device 50 according to the first embodiment, the light guiding member 52 and the imaging element 53 are held on a housing (not shown).

The light source 51 and the light receiving element 54 are mounted on an electric substrate (not shown), and the electric substrate is fixed to the housing with screws.

Further, the housing (not shown) and the light guiding member 52 are held in abutment against each other in an end portion of the light guiding member 52 so that dust, paper powder, and the like do not enter the housing through a gap.

Now, a method of discriminating the type of a recording material (object) through use of the discriminating device 50 according to the first embodiment is described.

As described below, through use of the discriminating device 50 according to the first embodiment, the type of the recording material P can be discriminated by illuminating the recording material P with light beams emitted from the discriminating device 50, receiving the scattered light beams from the illuminated recording material P with the discriminating device 50, and taking a surface image of the recording material P.

As illustrated in FIG. 1A and FIG. 1C, a plurality of light beams emitted from the light source 51 pass through the incident surface 52a of the light guiding member 52 and are reflected from the reflection surface 52b, to thereby enter the left side curved reflection surface 52c and the right side curved reflection surface 52d (not shown).

Then, the plurality of light beams having entered the left side curved reflection surface 52c and the right side curved reflection surface 52d are reflected, and at least parts of the reflected light beams become substantially parallel to each other at least within the first cross section parallel to the recording material P. Then, the plurality of light beams that have become substantially parallel to each other are emitted from the exit surface 52e to be radiated to the recording material P present on the irradiated surface.

In the discriminating device 50 according to the first embodiment, shading caused by unevenness of a surface of the recording material P is emphasized to improve accuracy of discrimination of the type of the recording material P by setting an average value of angles θ between each incident direction of the plurality of light beams with respect to the recording material P and the surface normal to the recording material P to a small angle of about 75°.

Parts of the scattered light beams from the recording material P present on the irradiated surface pass through the exit surface 52e and the scattered light exit surface 52f of the light guiding member 52, and are guided (converged) to a light receiving surface (image pickup surface) of the light receiving element 54 by the imaging element 53.

The discriminating device 50 according to the first embodiment is an equal-magnification imaging system. Therefore, the range of the recording material P on the irradiated surface, which is read by one pixel of the light receiving element 54, is identical with the size of the one pixel, that is, 42.3 square μm. An optical axis of the optical system, that is, the imaging element 53, is represented by the chain line in FIG. 1B and FIG. 1C.

Further, in the discriminating device 50 according to the first embodiment, a conjugate plane of the light receiving surface of the light receiving element 54 is set so as to be the surface of the recording material P that the light beams enter, that is, the irradiated surface.

In the discriminating device 50 according to the first embodiment, two regions of the recording material P on the irradiated surface are irradiated from two different directions through use of the left side curved reflection surface 52c and the right side reflection surface 52d, to thereby obtain two surface images of the recording material P.

Through use of the two surface images of the recording material P, accuracy of discrimination of the type of the recording material P is improved.

In Table 1, there are shown specification values of the discriminating device 50 according to the first embodiment.

TABLE 1

| | | |
|---|---|---|
| Dominant wavelength of light source 51 | λ [nm] | 550 |
| Refractive index of light guiding element 52 | n(λ) | 1.53318 |
| Left side curved reflection surface 52c | R | 4 |
| | K | −1 |
| | C4 | 0 |
| Right side curved reflection surface 52d | R | 4 |
| | K | −1 |
| | C4 | 0 |

TABLE 1-continued

|  | Coordinate | | | Tilt (surface normal direction) | | |
| --- | --- | --- | --- | --- | --- | --- |
|  | X | Y | Z | TiltX | TiltY | TiltZ |
| Light source 51 | 0 | 0 | 0 | 0 | −90 | 0 |
| Incident surface 52a | 0.6 | 0 | 0 | −180 | −90 | 0 |
| Reflection surface 52b | 2.35 | 4.5 | 0 | 0 | −50 | 0 |
| Left side curved reflection surface 52c (surface vertex) | 1.318 | −1.228 | −3.636 | 135 | −49 | 180 |
| Right side curved reflection surface 52d (surface vertex) | 1.318 | 1.228 | −3.636 | −135 | −49 | 180 |
| Exit surface 52e | 4.15 | 0 | 7 | −180 | 90 | 0 |
| Irradiated surface | 4.35 | 0 | 7 | 90 | 90 | 0 |
| Scattered light exit surface 52f | 2.65 | 0 | 7 | −180 | −90 | 0 |
| Contour back side lower end surface 52g | — | — | −1 | 0 | 0 | 180 |
| Contour back side upper end surface 52h | — | — | 0.953 | 0 | 0 | 180 |
| Contour front side upper end surface 52i | — | — | 8 | −180 | 0 | 180 |
| Contour front side lower inclined surface 52j | 0.6 | 0 | 2 | −180 | 50 | 180 |
| Contour left side end surface 52k | — | −12.5 | — | 90 | 0 | 180 |
| Contour right side end surface 52l | — | 12.5 | — | −90 | 0 | 180 |

In this case, an origin of a coordinate system is the center of the light emitting surface of the light source 51, and the conveyance direction of the recording material P, a direction perpendicular to the recording material P, that is, a normal direction to the irradiated surface, and a direction that is parallel to the recording material P and perpendicular to the conveyance direction thereof are defined as a Z direction, an X direction, and a Y direction (first direction), respectively.

Shapes of the left side curved reflection surface 52c and the right side curved reflection surface 52d are defined by a local polar coordinate system (hz) in which a surface vertex is an origin, a radial direction is an h direction, and the surface normal direction is a z direction, and are represented by the following expression (1):

$$z = \frac{h^2/2}{1 + (1 - (1+K)(h/R)^2)^{1/2}} + C_4 h^4 \quad (1)$$

where R, K, and C4 represent aspherical surface coefficients.

Further, as is understood from Table 1, the shape of the light guiding member 52 is a symmetric shape with respect to a cross section of Y=0.

In Table 1, TiltX, TiltY, and TiltZ represent clockwise rotation angles around a +X axis, a +Y axis, and a +Z axis, respectively.

In the discriminating device 50 according to the first embodiment, the left side curved reflection surface 52c and the right side curved reflection surface 52d protrude from a part of each of the contour front side lower inclined surface 52j and the scattered light exit surface 52f.

With the above-mentioned contour shape configuration, the left side curved reflection surface 52c and the right side curved reflection surface 52d each serve also as a stop for illumination light beams. In other words, the left side curved reflection surface 52c and the right side curved reflection surface 52d are each an optical surface configured to regulate the light beams.

Next, a method of discriminating the type of a recording material is described through simulation using a simple model with respect to the discriminating device 50 according to the first embodiment.

Figure 2A:
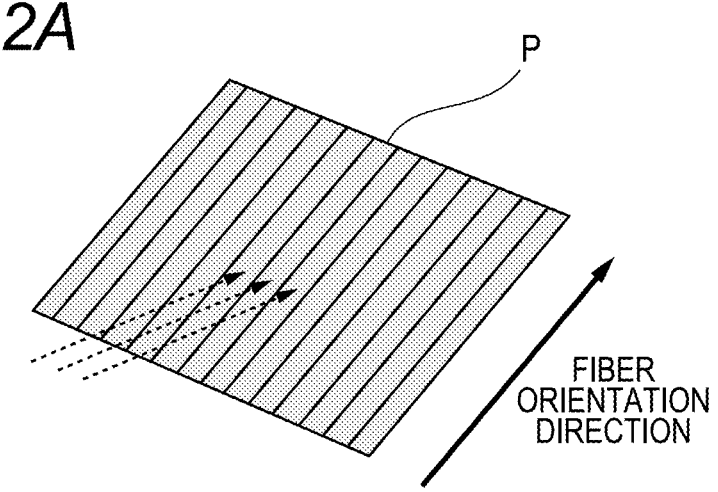
FIG. 2A is a view for illustrating a shape of a recording material used for simulation.
Figure 2B:
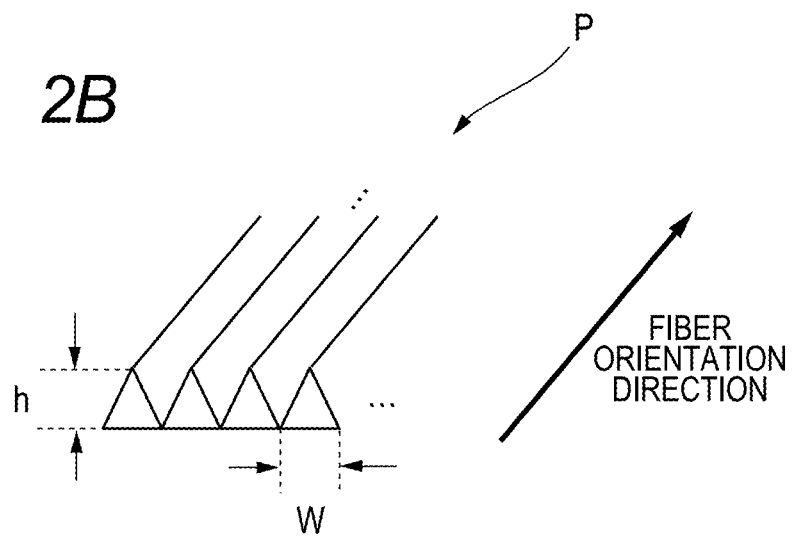
FIG. 2B is a view for illustrating the shape of the recording material used for the simulation.

FIG. 2A and FIG. 2B are each a view for illustrating a shape of the recording material P used for the simulation.

As illustrated in FIG. 2A and FIG. 2B, in the following simulation, it is assumed that a plurality of fibers each having a triangular prism shape having a height "h" of 10 μm and a width "w" of 10 μm are adjacent to each other and oriented in a predetermined direction in the recording material P that is paper.

The triangular prism shape simply represents unevenness caused by the fibers of the paper.

In the recording material P, it is assumed that a plurality of light beams that are parallel to each other enter an entire surface (two-dimensional surface) of the recording material P from a direction that forms an angle θ of 75° with respect to the surface normal to the recording material P.

Of the light beams that are scattered by Lambert scattering from each surface region of the recording material P, a two-dimensional light amount distribution of the light beams scattered in a direction perpendicular to the recording material P is acquired. This distribution corresponds to a surface image of the recording material P.

Then, a discriminator shown in FIG. 1B and FIG. 1C, acquires a maximum value and a minimum value of a light amount value from the acquired two-dimensional light amount distribution, and calculates a shading evaluation value E of the two-dimensional light amount distribution from the expression "(maximum value−minimum value)/maximum value".

The shading evaluation value E substantially corresponds to a determination amount for discriminating the type of the recording material P. That is, as the shading evaluation value E becomes larger, the surface of the recording material P becomes rougher. In contrast, as the shading evaluation value E becomes smaller, the surface of the recording material P becomes smoother.

In the simulation, while angles φ1 formed by the incident light beams with respect to the fiber orientation direction when the light beams are projected to the recording material P (irradiated surface) are changed, that is, while the recording material P is rotated around a direction perpendicular to the recording material P, the shading evaluation value E is calculated with respect to each of the angles φ1.

Figure 3A:
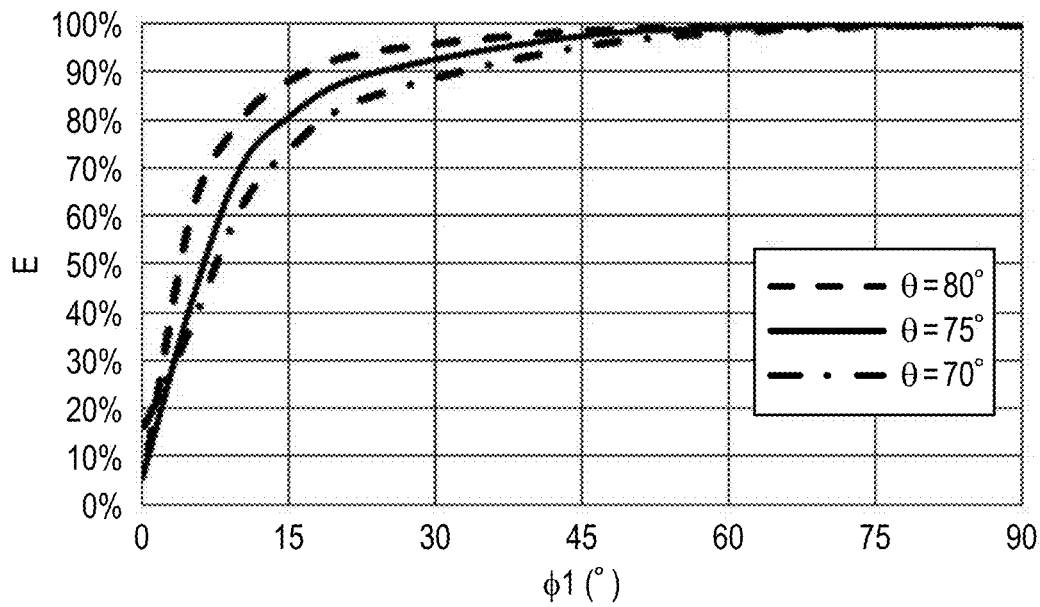
FIG. 3A is a graph for showing a relationship between an angle $\varphi 1$ and a shading evaluation value E obtained by the simulation.
Figure 3B:
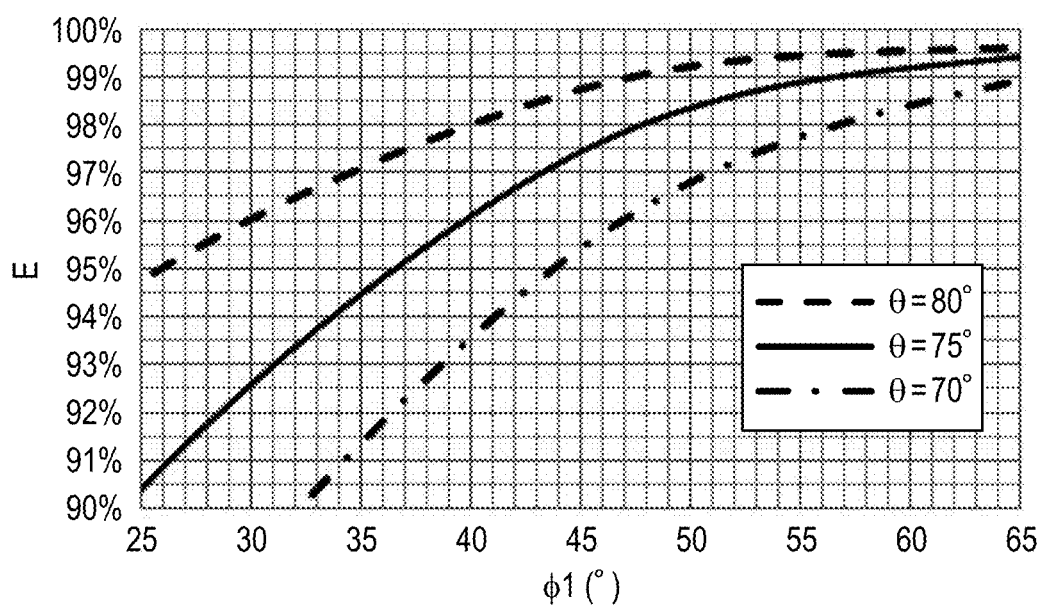
FIG. 3B is a partially enlarged graph of FIG. 3A.

FIG. 3A and FIG. 3B are a graph for showing a relationship between the angle φ1 and the shading evaluation value E obtained by the simulation and a partially enlarged graph thereof, respectively.

Regarding the angle θ, the respective cases of 70°, 75°, and 80° are shown.

As shown in FIG. 3A, the shading evaluation value E monotonously increases with respect to the angle $\varphi 1$.

Specifically, when the angle $\varphi 1$ is close to 90°, that is, when the fiber orientation direction and the incident light beams are substantially perpendicular to each other at a time when the light beams are projected to the recording material P, a shadow is formed in a direction perpendicular to the fiber orientation direction, and hence the shading evaluation value E becomes larger.

Meanwhile, when the angle $\varphi 1$ is close to 0°, that is, when the fiber orientation direction and the incident light beams are substantially parallel to each other at a time when the light beams are projected to the recording material P, a shadow is not formed on the surface of the recording material P, and hence the shading evaluation value E becomes smaller.

Here, when the illumination light beams have a certain spread (that is, the plurality of illumination light beams are not substantially parallel to each other), the angle $\varphi 1$ varies within each irradiation range of the recording material P corresponding to each pixel of the light receiving element 54, and hence the shading evaluation value E obtained in each pixel becomes different.

The foregoing causes the type of the recording material P to be discriminated differently in each pixel of the light receiving element 54, with the result that recording material discrimination accuracy is deteriorated.

In view of the foregoing, in the discriminating device 50 according to the first embodiment, in order to reduce deterioration in recording material discrimination accuracy, parts of the plurality of light beams entering the recording material P are set to be substantially parallel to each other at least in a plane parallel to the recording material P.

Next, parallelism between the plurality of light beams entering the recording material P in the discriminating device 50 according to the first embodiment is discussed.

Figure 4:
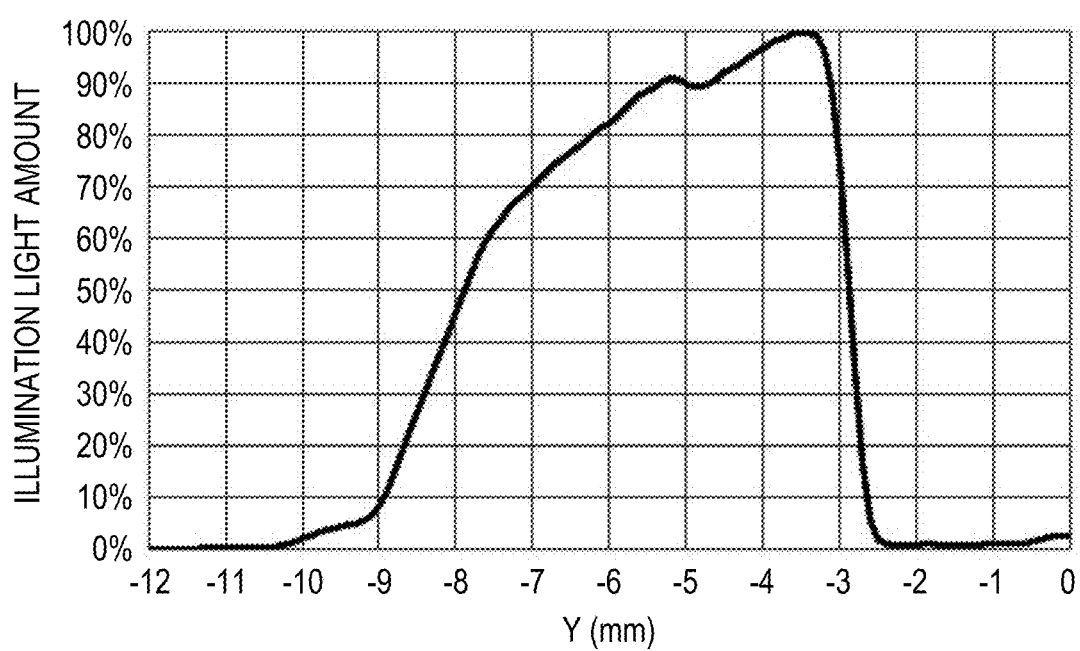
FIG. 4 is a graph for showing a relationship between a Y coordinate and an illumination light amount on an irradiated surface in the discriminating device according to the first embodiment.

FIG. 4 is a graph for showing a relationship between an illumination light amount on the irradiated surface and a Y coordinate at Z=7 mm in the discriminating device 50 according to the first embodiment.

In FIG. 4, the illumination light amount is normalized with a maximum value being 100%.

In this case, as shown in Table 1, the position of Z=7 mm corresponds to a Z coordinate of a second cross section including the optical axis of the imaging element 53 parallel to the Y direction.

That is, FIG. 4 is a graph for showing a relationship between the illumination light amount and the Y coordinate on a line of intersection between the second cross section and the irradiated surface.

In the discriminating device 50 according to the first embodiment, as illustrated in FIG. 1D, two right and left portions on the irradiated surface (that is, a predetermined region in which Y is positive and a predetermined region in which Y is negative) are illuminated. Those two predetermined regions are symmetrical with respect to an axis of Y=0, and the illumination light amount distribution is also symmetrical with respect thereto. Therefore, only the illumination light amount distribution on the left side (−Y direction) is considered below.

As shown in FIG. 4, it is understood that a range of about −10 mm≤Y≤−3 mm is illuminated.

However, when the illumination light amount is small, the ratio of electric noise increases. Therefore, a range of 50% or more of a peak light amount is an effective range that can be used for discriminating the type of the recording material P.

Thus, in the discriminating device 50 according to the first embodiment, a range of −7 mm≤Y≤−3 mm is set as the effective region (first effective region).

Further, similarly, a region of 3 mm≤Y≤7 mm is also set as an effective region (second effective region).

Further, a plurality of light beams entering the first and second effective regions are referred to as "a plurality of first light beams" and "a plurality of second light beams", respectively.

Thus, only the scattered light beams from the effective region are used for discriminating the type of the recording material, and hence it is only required that only the plurality of light beams illuminating the effective region be substantially parallel to each other at least within a plane parallel to the recording material P.

Figure 5A:
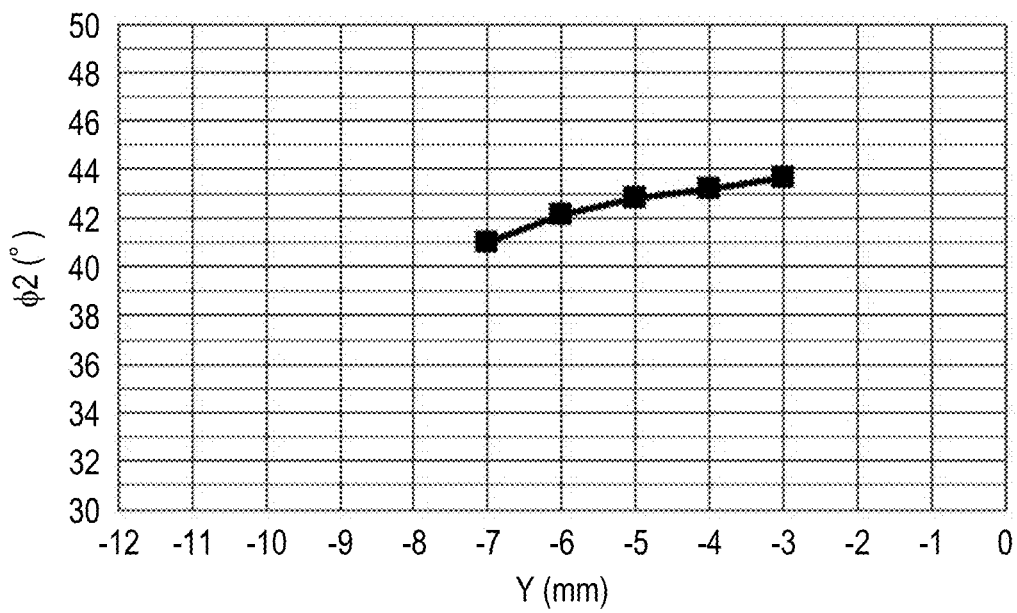
FIG. 5A is a graph for showing a relationship between each Y coordinate and an angle $\varphi 2$ in an effective region in the discriminating device according to the first embodiment.
Figure 5B:
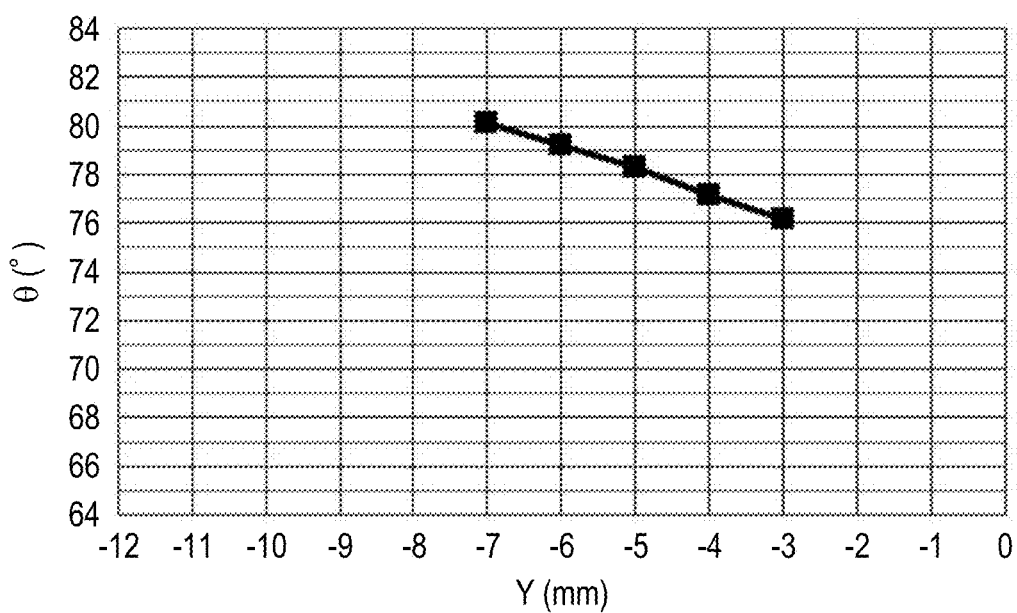
FIG. 5B is a graph for showing a relationship between each Y coordinate and an angle $\theta$ in the effective region in the discriminating device according to the first embodiment.

FIG. 5A and FIG. 5B are graphs for showing a value of an angle $\varphi 2$ formed by the illumination light beams with respect to the conveyance direction (Z direction) of the recording material P and a value of the angle $\theta$ formed by the illumination light beams with respect to the normal (X direction) to the irradiated surface (recording material P), when the illumination light beams, which enter a range read by one pixel of the light receiving element 54 with each Y coordinate in the effective region being the center at Z=7 mm, that is, a region of 42.3 square in the discriminating device 50 according to the first embodiment, are projected to the irradiated surface (recording material P), respectively.

In the discriminating device 50 according to the first embodiment, for example, due to the finite size of the light source 51 and the configuration of the light guiding element 52 (for example, the shapes of the left side curved reflection surface 52c and the right side curved reflection surface 52d, and the relative position with respect to the light source 51), the incident angle of the light beams illuminating the range read by one pixel of the light receiving element 54 has a spread, that is, the incident angle has a predetermined distribution width.

Therefore, in FIG. 5A and FIG. 5B, average values of the angles $\varphi 2$ and $\theta$ of the plurality of light beams having entered the region of 42.3 square μm with each Y coordinate being the center are shown.

As shown in FIG. 5A, in the discriminating device 50 according to the first embodiment, the angle $\varphi 2$ has a value of from 41.0° to 43.6° in the effective region. Thus, a variation amount $\Delta \varphi 2$ of the angle $\varphi 2$ is 2.6°.

Further, as shown in FIG. 5B, in the discriminating device 50 according to the first embodiment, the angle $\theta$ has a value of from 76.2° to 80.1° in the effective region. Thus, a variation amount $\Delta \theta$ of the angle $\theta$ is 3.9°.

Those results are checked against the above-mentioned simulation results.

First, when the fiber orientation direction of the recording material P is parallel to the conveyance direction, the angle $\varphi 1$ and the angle $\varphi 2$ are the same. Therefore, a variation amount $\Delta E$ of the shading evaluation value E in the effective region is equal to a variation amount of the shading evaluation value E at the angle $\varphi 1$ of from 41.0° to 43.6° (average value: 42.3°).

Thus, when the graphs at $\theta$=75° of FIG. 3A and FIG. 3B are referred to, $\Delta E$ is 0.7%.

That is, in the discriminating device 50 according to the first embodiment, the distribution of the shading evaluation value E output from each pixel of the light receiving element 54 configured to read the effective region can be suppressed to 0.7%, and the deterioration in recording material discrimination accuracy can be reduced.

Next, when the fiber orientation direction of the recording material P is perpendicular to the conveyance direction, the angle φ1 and the angle φ2 have a difference of 90°. Therefore, the variation amount ΔE of the shading evaluation value E in the effective region is equal to a variation amount of the shading evaluation value E at the angle φ1 of from 46.4° to 49.0° (average value: 47.7°).

Thus, when the graphs at θ=75° of FIG. 3A and FIG. 3B are referred to, ΔE is 0.5%.

That is, also in this case, in the discriminating device 50 according to the first embodiment, the distribution of the shading evaluation value E output from each pixel of the light receiving element 54 configured to read the effective region can be suppressed to 0.5%, and the deterioration in recording material discrimination accuracy can be reduced.

In general, printing paper is used as the recording material P, and the printing paper is cut substantially in a horizontal direction or substantially in a perpendicular direction with respect to the fiber orientation direction.

Therefore, as described above, it is suitable for an actual situation to consider the case in which the fiber orientation direction is parallel or perpendicular to the conveyance direction.

In the discriminating device 50 according to the first embodiment, as described above, the recording material P is illuminated with the plurality of light beams so that an average value of the angles φ2 formed by each incident direction of the plurality of light beams with respect to the conveyance direction of the recording material P is in the vicinity of ±45° when the plurality of light beams are projected to the recording material P. The reason for this is to suppress the variation amount ΔE of the shading evaluation value E to stabilize the shading evaluation value E.

In the discriminating device 50 according to the first embodiment, when the plurality of first light beams are projected to the recording material P, a difference between an average value of incident angles of the plurality of first light beams with respect to the irradiated surface and an average value of incident angles of the plurality of second light beams with respect to the irradiated surface is 80° or more and 110° or less.

In the discriminating device 50 according to the first embodiment, an average value of the angles φ2 of the plurality of first light beams entering the first effective region is +35° or more and +55° or less, and an average value of the angles φ2 of the plurality of second light beams entering the second effective region is −35° or less and −55° or more (125° or more and 145° or less).

Further, in the discriminating device 50 according to the first embodiment, the recording material P is conveyed so that the fiber orientation direction is parallel or perpendicular to the conveyance direction of the recording material P. Therefore, an average value of the angles φ1 of one of the plurality of first and second light beams entering the first and second effective regions, respectively, is +35° or more and +55° or less, and an average value of the angles φ1 of the other is −35° or less and −55° or more (125° or more and 145° or less).

Further, in the discriminating device 50 according to the first embodiment, the recording material P is conveyed so that the fiber orientation direction is parallel or perpendicular to the extending direction of the array type image pickup element 54. Therefore, when the plurality of first and second light beams are projected to the recording material P, an average value of angles formed by each incident direction of one of the plurality of first and second light beams entering the first and second effective region, respectively, with respect to the extending direction (first direction) of the array type image pickup element 54 is +35° or more and +55° or less, and an average value of the angles formed by each incident direction of the other with respect to the extending direction (first direction) of the array type image pickup element 54 is −35° or less and −55° or more (125° or more and 145° or less).

In the discriminating device 50 according to the first embodiment, the conveyance direction of the recording material P and the extending direction of the array type image pickup element 54 are perpendicular to each other. However, the present invention is not limited thereto, and the conveyance direction of the recording material P and the extending direction of the array type image pickup element 54 may not be perpendicular to each other.

When discrimination is performed, it is only required that information on at least any one of the first effective region and the second effective region be obtained. Therefore, all the above-mentioned angle relationships are not necessarily required to be satisfied.

Further, ΔE of 2% or less is sufficient as recording material discrimination accuracy.

As shown in FIG. 3A and FIG. 3B, a variation amount Δφ1 of the angle φ1 satisfying ΔE≤2% at the angle θ of 75° and the angle φ1 in the vicinity of 45° is about 7°.

Thus, in the discriminating device 50 according to the first embodiment, when the variation amount Δφ1 of the angle φ1 formed by the incident light beams with respect to the fiber orientation direction within a plane parallel to the recording material P in the effective region is 7° or less, deterioration in recording material discrimination accuracy can be reduced.

In other words, in the discriminating device 50 according to the first embodiment, it is only required that an angle formed by the plurality of first light beams with each other, which are emitted from the light guiding member 52 and enter the first effective region of the irradiated surface, within the first cross section parallel to the irradiated surface be set to 7° or less.

The variation amount Δφ1 being 7° or less is herein defined as "substantially parallel" regarding the angle φ1 in the discriminating device 50 according to the first embodiment.

Now, a case is considered in which the discriminating device does not have a configuration in which the plurality of illumination light beams are bent to be substantially parallel to each other, and the recording material P is illuminated while the illumination light beams have a spread.

Specifically, a case is considered in which the variation amount αφ1 of the angle φ1 formed by the incident light beams with respect to the fiber orientation direction within a plane parallel to the recording material P in the effective region is 10° (that is, ±5°) as in Japanese Patent Application Laid-Open No. 2010-283670.

In this case, for comparison, the average value of the angles φ1 is set to the same as that in the discriminating device 50 according to the first embodiment.

First, when the fiber orientation direction of the recording material P is parallel to the conveyance direction, a variation amount ΔE of the shading evaluation value E in the effective region is equal to a variation amount of the shading evaluation value E at the angle φ1 of from 37.3° to 47.3° (average value: 42.3°).

Thus, when the graphs at θ=75° of FIG. 3A and FIG. 3B are referred to, ΔE is 2.8%.

That is, in this case, the variation amount $\Delta E$ of the shading evaluation value E output from each pixel of the light receiving element configured to read the effective region becomes larger than 2%, and hence deterioration in recording material discrimination accuracy cannot be reduced.

Next, when the fiber orientation direction of the recording material P is perpendicular to the conveyance direction, the variation amount $\Delta E$ of the shading evaluation value E in the effective region is equal to a variation amount of the shading evaluation value E at the angle $\varphi 1$ of from 42.7° to 52.7° (average value: 47.7°).

Thus, when the graphs at $\theta=75°$ of FIG. 3A and FIG. 3B are referred to, $\Delta E$ is 1.5%.

In this case, the variation amount $\Delta E$ of the shading evaluation value E output from each pixel of the light receiving element configured to read the effective region is 2% or less.

However, as described above, printing paper cut substantially in a horizontal direction or substantially in a perpendicular direction to the fiber orientation direction is generally used as the recording material P. Therefore, it is required to consider both the case in which the fiber orientation direction is parallel to the conveyance direction and the case in which the fiber orientation direction is perpendicular to the conveyance direction.

Thus, it can be said that, when the incident light beams having the variation amount $\Delta \varphi 1$ of 10° are used, deterioration in recording material discrimination accuracy cannot be reduced.

As described above, in the discriminating device 50 according to the first embodiment, deterioration in accuracy of discrimination of the type of a recording material can be reduced by reducing a variation in characteristic value indicating surface smoothness of the recording material P acquired by each pixel of the light receiving element 54.

Further, as described above, in the discriminating device 50 according to the first embodiment, the variation amount $\Delta \theta$ of the angle $\theta$ is 3.9° in the effective region.

Thus, when the position at $\varphi 1=45°$ of FIG. 3A and FIG. 3B are referred to, $\Delta E$ is 1.0%.

Then, as illustrated in FIG. 3A and FIG. 3B, the variation amount $\Delta \theta$ of the angle $\theta$ satisfying $\Delta E \leq 2\%$, at which the recording material discrimination accuracy is sufficient, at the angle $\varphi 1$ of 45° and the angle $\theta$ in the vicinity of 75° is about 6°.

In view of the foregoing, the variation amount $\Delta \theta$ being 6° or less is defined as "substantially parallel" regarding the angle $\theta$ in the discriminating device 50 according to the first embodiment.

In other words, in the discriminating device 50 according to the first embodiment, a difference between the angles formed by each incident direction of the plurality of first light beams with respect to the normal to the irradiated surface is set to 6° or less.

In the discriminating device 50 according to the first embodiment, as described above, the two right and left portions on the irradiated surface are illuminated, that is, the effective regions are present in the two right and left portions, and the shading evaluation value E calculated in each pixel is averaged in each effective region.

Thus, when there are a plurality of effective regions, the effects of the first embodiment can be obtained as long as the plurality of light beams entering each effective region are substantially parallel to each other.

Further, in the discriminating device 50 according to the first embodiment, when the plurality of light beams are projected to the recording material P, an average value of the angles $\varphi 2$ formed by each incident direction of the plurality of light beams with respect to the conveyance direction is substantially ±45°. However, the present invention is not limited thereto.

When the discriminating device 50 has a configuration in which the fiber orientation direction of the recording material P is in any one of a parallel direction and a perpendicular direction with respect to the conveyance direction, the effects of the first embodiment can be obtained by illuminating the recording material P so that the angle $\varphi 1$ is 35° or more and 90° or less as shown in FIG. 3A.

Further, in the discriminating device 50 according to the first embodiment, a surface for making the plurality of incident light beams substantially parallel to each other (that is, the left side curved reflection surface 52c and the right side curved reflection surface 52d) is formed of a paraboloidal surface.

Further, the light source 51 is arranged in the vicinity of a focal point of the paraboloidal surface also in consideration of reflection by the reflection surface 52b. With this, the plurality of incident light beams can be made substantially parallel to each other with the simple shape and configuration.

However, the present invention is not limited thereto, and it is not required that the surface for making the plurality of incident light beams substantially parallel to each other be formed of one surface. Even when the surface is formed of a plurality of surfaces, the effects of the first embodiment can be obtained.

Further, the surface is not limited to a paraboloidal surface. Even when the surface has any other shapes such as a concave-shaped reflection surface and a concave-shaped diffraction surface, the effects of the first embodiment can be obtained.

Further, it is conceivable that the optical surface for making the plurality of incident light beams substantially parallel to each other is omitted through use of a stop or the like. However, in this case, the effective region becomes narrower, and the light guiding member is enlarged. Therefore, it is not preferred that the stop or the like be used instead of the optical surface.

Further, in the discriminating device 50 according to the first embodiment, due to the above-mentioned configuration, the plurality of illumination light beams are substantially parallel to each other in a traveling direction thereof and substantially parallel to each other also within a plane perpendicular to the recording material P.

With this, the effect of stabilizing shading caused by unevenness of the surface of the recording material P to stabilize accuracy of discrimination of the type of a recording material is obtained.

Further, an average value of the angles $\theta$ formed by each incident direction of the plurality of illumination light beams with respect to the normal to the recording material P (irradiated surface) is 70° or more.

With this, the effect of clarifying shading caused by unevenness of the surface of the recording material P to improve accuracy of discrimination of the type of a recording material is obtained.

Further, in the discriminating device 50 according to the first embodiment, the surface for making the plurality of incident light beams substantially parallel to each other (that is, the left side curved reflection surface 52c and the right side curved reflection surface 52d) is formed of a reflection surface having power stronger than that of a refraction surface.

With this, the optical surface having a gentle and simple shape can make the plurality of incident light beams substantially parallel to each other.

Further, it is not required to apply reflection coating or the like to the reflection surface by configuring the discriminating device 50 so that a total reflection condition is satisfied.

However, the present invention is not limited thereto. Even when a refraction surface or a diffraction surface is used as the optical surface for making the plurality of incident light beams substantially parallel to each other, the effects of the first embodiment can be obtained.

Further, the light guiding member 52 included in the discriminating device 50 according to the first embodiment includes the incident surface 52a, the reflection surface 52b, the left side curved reflection surface 52c or the right side curved reflection surface 52d, and the exit surface 52e in the stated order from the light source side to the side of the irradiated surface, as the optical surfaces in an optical path of the illumination light beams entering the irradiated surface.

Thus, the surface for making the plurality of incident light beams substantially parallel to each other (that is, the left side curved reflection surface 52c and the right side curved reflection surface 52d) is formed at the second position counted from the irradiated surface in the light guiding member 52.

With this, the plurality of incident light beams can be made substantially parallel to each other at a position being away from the light source 51, to thereby enlarge an illumination range.

Further, the present invention is not limited thereto. The optical surface closest to the irradiated surface in the light guiding member 52 may be formed as the surface for making the plurality of incident light beams substantially parallel to each other.

Further, in the discriminating device 50 according to the first embodiment, through formation of the exit surface 52e of the light guiding member 52 into a flat surface, the recording material P on the light guiding member 52 can be smoothly conveyed, and deposition of paper powder and the like generated from the recording material P on the periphery of the light guiding member 52 can be reduced.

Further, in the discriminating device 50 according to the first embodiment, a one-dimensional image is obtained by guiding the scattered light from the recording material P to the light receiving element 54 having a configuration in which photoelectric conversion elements are arranged in an array (one-dimensionally) in the Y direction with the imaging element 53, which is one-dimensional Selfoc (trademark) Lens Array extending in the Y direction.

However, the present invention is not limited thereto, and the imaging element 53 and the light receiving element 54 may be configured so that a two-dimensional image can be obtained.

In the discriminating device 50 according to the first embodiment, Selfoc (trademark) Lens Array is used as the imaging element 53, but the present invention is not limited thereto. A non-equal-magnification imaging system may be used as the imaging element 53.

In the discriminating device 50 according to the first embodiment, arrangement, height, width, and the like of fibers can be estimated by presuming a model through use of the measured shading evaluation value E and performing the above-mentioned simulation.

[Second Embodiment]

FIG. 6A, FIG. 6B, FIG. 6C, and FIG. 6D are a perspective view of main portions of a discriminating device 60 according to a second embodiment of the present invention, a side view of the main portions thereof, a top view thereof, and a rear view thereof, respectively.

In FIG. 6A to FIG. 6D, the dotted lines and the solid lines each represent parts of light beams traveling inside and outside of light guiding members 62a and 62b.

Further, in the discriminating device 60 according to the second embodiment, the same members as those of the discriminating device 50 according to the first embodiment are denoted by the same reference symbols as those therein, and description thereof is omitted.

The discriminating device 60 according to the second embodiment includes light sources 51a and 51b, the light guiding members 62a and 62b, a dust-proof sheet 63, the imaging element 53, and the light receiving element 54.

In the discriminating device 60 according to the second embodiment, the light guiding members 62a and 62b, the dust-proof sheet 63, and the imaging element 53 are held on a housing (not shown).

The light sources 51a and 51b and the light receiving element 54 are mounted on an electric substrate (not shown), and the electric substrate is fixed to the housing with screws.

Further, the housing (not shown) and the dust-proof sheet 63 are held in abutment against each other in end portions of the dust-proof sheet 63 so that dust, paper powder, and the like do not enter the housing through a gap therebetween.

Both the light guiding members 62a and 62b are optical elements having the same shape, which are formed of a resin (Zeonex E48R). The light guiding member 62a (62b) includes an incident surface 62aa (62ba), a reflection surface 62ab (62bb), and a curved exit surface 62ac (62bc).

The dust-proof sheet 63 is a transparent sheet having a thickness of 0.1 mm formed of a resin (PMMA).

Next, a method of discriminating the type of a recording material through use of the discriminating device 60 according to the second embodiment is described.

Figure 6A:
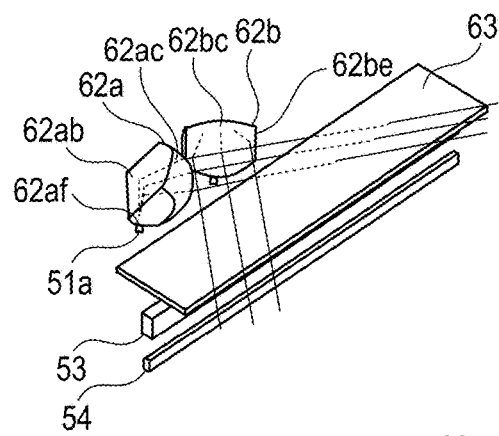
FIG. 6A is a perspective view of main portions of a discriminating device according to a second embodiment of the present invention.
Figure 6B:
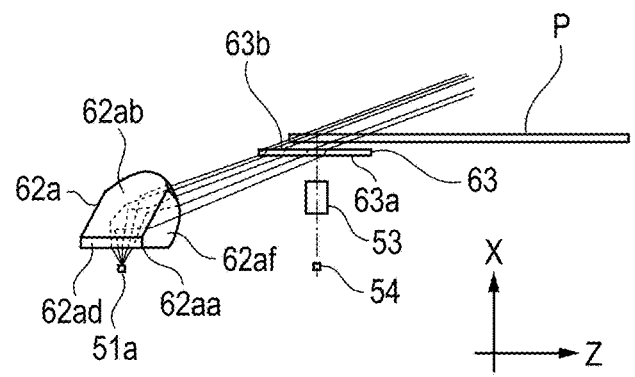
FIG. 6B is a side view of the main portions of the discriminating device according to the second embodiment.

As illustrated in FIG. 6B, a plurality of light beams emitted from the light source 51a (51b) pass through the incident surface 62aa (62ba) of the light guiding member 62a (62b), and are reflected from the reflection surface 62ab (62bb). Then, the plurality of light beams are made substantially parallel to each other by the curved exit surface 62ac (62bc).

Then, the plurality of light beams emitted from the curved exit surface 62ac (62bc) pass through a dust-proof sheet back surface 63a and a dust-proof sheet front surface 63b, and are radiated to the recording material P present on the irradiated surface.

In the discriminating device 60 according to the second embodiment, shading caused by unevenness of the surface of the recording material P is emphasized to improve accuracy of discrimination of the type of the recording material P by setting an average value of the angles θ between each incident direction of the plurality of light beams with respect to the recording material P and the surface normal to the recording material P to a small angle of about 75°.

Further, the light source 51a and the light guiding member 62a are symmetrical to the light source 51b and the light guiding member 62b with respect to a cross section of Y=0, respectively.

Then, parts of the scattered light beams from the recording material P present on the irradiated surface pass through the dust-proof sheet front surface 63b and the dust-proof sheet back surface 63a, and are guided (converged) to the light receiving element 54 to be subjected to equal-magnification imaging by the imaging element 53.

In Table 2, there are shown specification values of the discriminating device 60 according to the second embodiment.

TABLE 2

| Dominant wavelength of light source 51a | λ [nm] | 550 | | | |
|---|---|---|---|---|---|
| Refractive index of light guiding member 62a | n(λ) | 1.53318 | | | |
| Curved exit surface 62ac | R | 1.495 | | | |
| | K | −0.518 | | | |
| | C4 | 5.107E−03 | | | |

| | Coordinate | | | Tilt (surface normal direction) | | |
|---|---|---|---|---|---|---|
| | X | Y | Z | TiltX | TiltY | TiltZ |
| Light source 51a | 0 | 2.5 | 0 | 0 | −90 | 0 |
| Incident surface 62aa | 0.6 | 2.5 | 0 | −135 | −90 | 0 |
| Reflection surface 62ab | 1.7 | 2.5 | 0 | −135 | 37.5 | 180 |
| Curved exit surface 62ac | 2.282 | 0.963 | 1.537 | 45 | 15 | 0 |
| Dust-proof sheet back surface 63a | 4.05 | 0 | 7 | 0 | −90 | 0 |
| Dust-proof sheet front surface 63b | 4.15 | 0 | 7 | −180 | 90 | 0 |
| Irradiated surface | 4.35 | 0 | 7 | 90 | 90 | 0 |
| Contour back side end surface 62ad | — | 2.854 | −0.354 | −135 | 0 | 0 |
| Contour left side end surface 62ae | — | 1.439 | −1.061 | 135 | 0 | 0 |
| Contour right side end surface 62af | — | 3.561 | 1.061 | −45 | 0 | 0 |

In this case, an origin of a coordinate system is a middle point of a line obtained by connecting the centers of the respective light emitting surfaces of the light sources 51a and 51b, and the conveyance direction of the recording material P, a direction perpendicular to the recording material P, and a direction that is parallel to the recording material P and perpendicular to the conveyance direction thereof are defined as a Z direction, an X direction, and a Y direction, respectively.

Further, in Table 2, the light source 51b and the light guiding member 62b are arranged so as to be symmetrical to the light source 51a and the light guiding member 62a, and hence description thereof is omitted.

The shape of the curved exit surface 62ac is represented by the above-mentioned expression (1), and R, K, and C4 represent aspherical surface coefficients.

By virtue of the above-mentioned contour shape configuration, the curved exit surfaces 62ac and 62bc each also serve as a stop for the illumination light beams.

Similarly to the discriminating device 50 according to the first embodiment, in the discriminating device 60 according to the second embodiment, in order to reduce deterioration in accuracy of discrimination of the type of a recording material, parts of the plurality of light beams entering the recording material P are set to be substantially parallel to each other at least in a plane parallel to the recording material P.

Next, parallelism between the plurality of light beams entering the recording material P in the discriminating device 60 according to the second embodiment is discussed.

Figure 7:
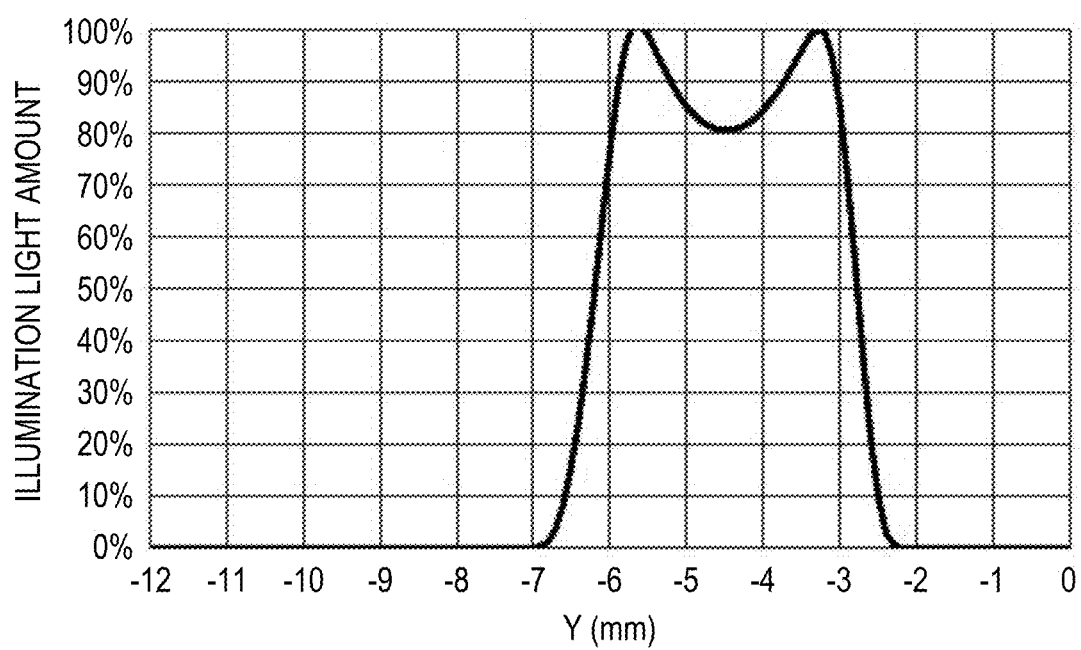
FIG. 7 is a graph for showing a relationship between a Y coordinate and an illumination light amount on an irradiated surface in the discriminating device according to the second embodiment.

FIG. 7 is a graph for showing a relationship between an illumination light amount on the irradiated surface and a Y coordinate at Z=7 mm in the discriminating device 60 according to the second embodiment.

In FIG. 7, the illumination light amount is normalized with a maximum value being 100%.

Figure 6C:
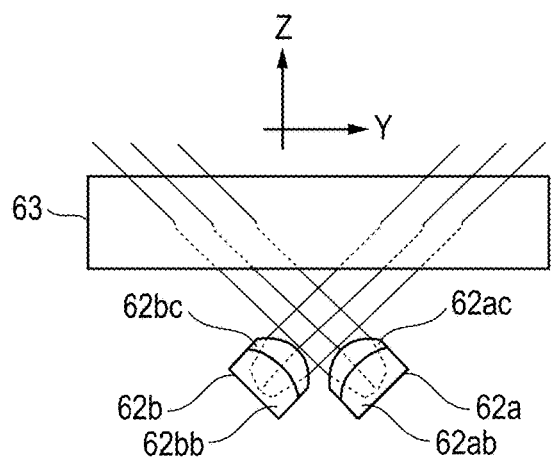
FIG. 6C is a top view of the discriminating device according to the second embodiment.
Figure 6D:
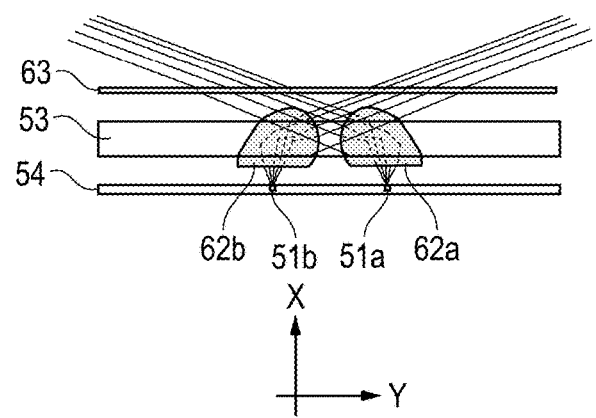
FIG. 6D is a rear view of the discriminating device according to the second embodiment.

In the discriminating device 60 according to the second embodiment, as illustrated in FIG. 6C, two right and left portions on the irradiated surface (that is, a predetermined region in which Y is positive and a predetermined region in which Y is negative) are illuminated. Those two predetermined regions are symmetrical with respect to an axis of Y=0, and the illumination light amount distribution is also symmetrical with respect thereto. Therefore, only the illumination light amount distribution on the left side (−Y direction) is considered below.

As shown in FIG. 7, it is understood that a range of about −7 mm≤Y≤−2.5 mm is illuminated.

However, when the illumination light amount is small, the ratio of electric noise increases. Therefore, a range of 50% or more of a peak light amount is an effective range that can be used for discriminating the type of the recording material P.

Thus, in the discriminating device 60 according to the second embodiment, a range of −6 mm≤Y≤−3 mm is set as the effective region (first effective region).

Further, similarly, a region of 3 mm≤Y≤6 mm is also set as an effective region (second effective region).

Further, a plurality of light beams entering the first and second effective regions are referred to as "a plurality of first light beams" and "a plurality of second light beams", respectively.

Thus, only the scattered light beams from the effective region are used for discriminating the type of the recording material, and hence it is only required that only the plurality of light beams illuminating the effective region be substantially parallel to each other at least within a plane parallel to the recording material P.

Figure 8A:
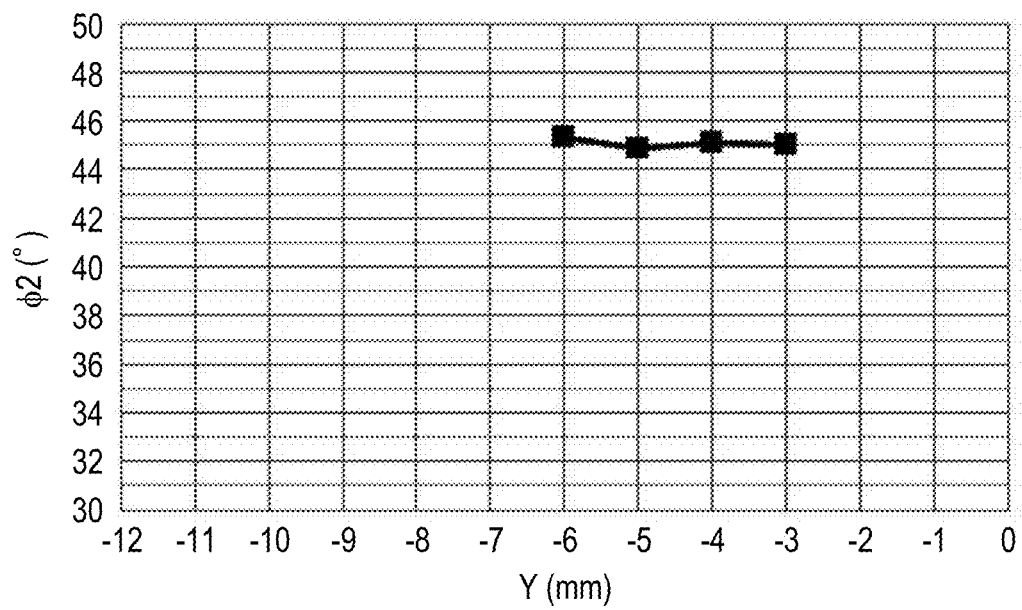
FIG. 8A is a graph for showing a relationship between each Y coordinate and an angle $\varphi 2$ in an effective region in the discriminating device according to the second embodiment.
Figure 8B:
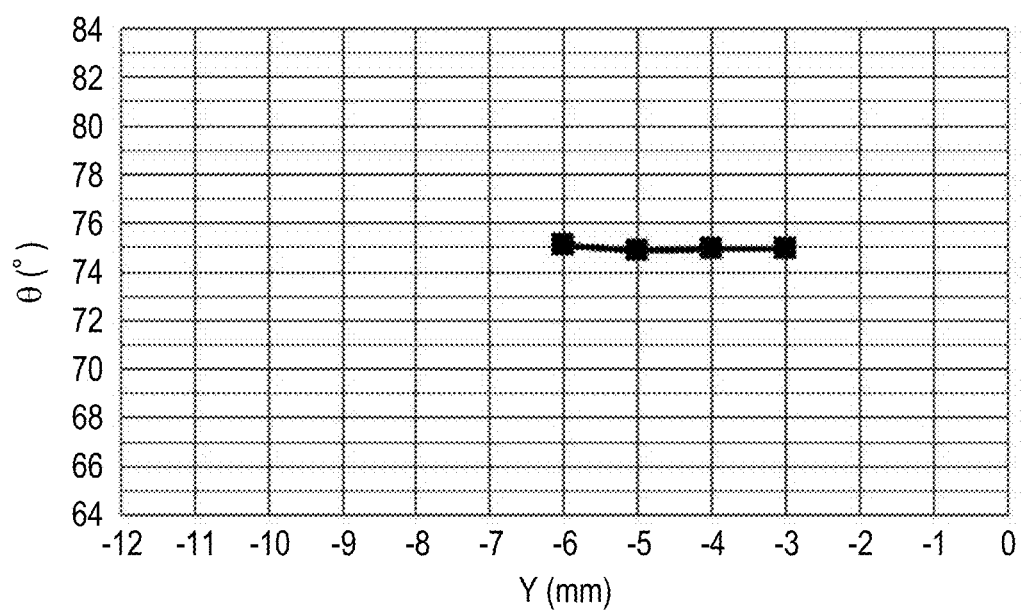
FIG. 8B is a graph for showing a relationship between each Y coordinate and an angle $\theta$ in the effective region in the discriminating device according to the second embodiment.

FIG. 8A and FIG. 8B are graphs for showing a value of an angle φ2 formed by the illumination light beams with respect to the conveyance direction (Z direction) of the recording material P and a value of the angle θ formed by the illumination light beams with respect to the surface normal (X direction) to the recording material P, when the illumination light beams, which enter a range read by one pixel of the light receiving element 54 with each Y coordinate in the effective region being the center at Z=7 mm, that is, a region of 42.3 square in the discriminating device 60 according to the second embodiment, are projected to the recording material P, respectively.

Also in the discriminating device 60 according to the second embodiment, for example, due to the finite size of the light sources 51a and 51b and the configuration of the light guiding elements 62a and 62b (for example, the shapes of the curved emit surfaces 62ac and 62bc, and the relative position with respect to the light sources 51a and 51b), the incident angle of the light beams illuminating the range read by one pixel of the light receiving element 54 has a spread, that is, the incident angle has a predetermined distribution width.

Therefore, in FIG. 8A and FIG. 8B, average values of the angles φ2 and θ of the plurality of light beams having entered the region of 42.3 square μm with each Y coordinate being the center are shown.

As shown in FIG. 8A, in the discriminating device 60 according to the second embodiment, the angle φ2 has a value of from 44.9° to 45.3° in the effective region. Thus, a variation amount Δφ2 of the angle φ2 is 0.4°.

Further, as shown in FIG. 8B, in the discriminating device 60 according to the second embodiment, the angle θ has a value of from 74.9° to 75.1° in the effective region. Thus, a variation amount Δθ of the angle θ is 0.2°.

Those results are checked against the simulation results shown in FIG. 3A and FIG. 3B.

First, when the fiber orientation direction of the recording material P is parallel to the conveyance direction, the angle φ1 and the angle φ2 are the same. Therefore, the variation amount ΔE of the shading evaluation value E in the effective region is equal to a variation amount of the shading evaluation value E at the angle φ1 of from 44.9° to 45.3° (average value: 45.1°).

Thus, when the graphs at θ=75° of FIG. 3A and FIG. 3B are referred to, ΔE is 0.1%.

That is, in the discriminating device 60 according to the second embodiment, the distribution of the shading evaluation value E output from each pixel of the light receiving element 54 configured to read the effective region can be suppressed to 0.1%, and the deterioration in recording material discrimination accuracy can be reduced.

Next, when the fiber orientation direction of the recording material P is perpendicular to the conveyance direction, the angle φ1 and the angle φ2 have a difference of 90°. Therefore, the variation amount ΔE of the shading evaluation value E in the effective region is equal to a variation amount of the shading evaluation value E at the angle φ1 of from 44.7° to 45.1° (average value: 44.9°).

Thus, when the graphs at θ=75° of FIG. 3A and FIG. 3B are referred to, ΔE is 0.1%.

That is, also in this case, in the discriminating device 60 according to the second embodiment, the distribution of the shading evaluation value E output from each pixel of the light receiving element 54 configured to read the effective region can be suppressed to 0.1%, and the deterioration in recording material discrimination accuracy can be reduced.

As described above, also in the discriminating device 60 according to the second embodiment, ΔE≤2% is satisfied, and hence deterioration in accuracy of discrimination of the type of the recording material P can be reduced by reducing a variation in characteristic value indicating surface smoothness of the recording material P acquired by each pixel of the light receiving element 54.

Further, as described above, in the discriminating device 60 according to the second embodiment, the variation amount Δθ of the angle θ is 0.2° in the effective region.

Thus, when the position at φ1=45° of FIG. 3A and FIG. 3B are referred to, ΔE is 0.07%.

The light guiding member 62a (62b) included in the discriminating device 60 according to the second embodiment includes the incident surface 62aa (62ba), the reflection surface 62ab (62bb), and the curved exit surface 62ac (62bc) in the stated order from the light source side to the side of the irradiated surface, as the optical surfaces in an optical path of the illumination light beams entering the irradiated surface.

Thus, a surface for making the plurality of incident light beams substantially parallel to each other (that is, the curved exit surface 62ac (62bc)) is formed most closely to the irradiated surface in the light guiding member 62a (62b).

With this, the plurality of incident light beams can be made substantially parallel to each other at a position being away from the light source 51a (51b), to thereby enlarge an illumination range.

Further, the present invention is not limited thereto, and the second optical surface counted from the side of the irradiated surface in the light guiding member 62a (62b) may be formed as the surface for making the plurality of incident light beams substantially parallel to each other.

The dust-proof sheet 63 does not function as the optical surface for making the plurality of incident light beams substantially parallel to each other, and hence the dust-proof sheet 63 is not considered as such optical surface in the above-mentioned discussion.

[Image Forming Apparatus]

Figure 9:
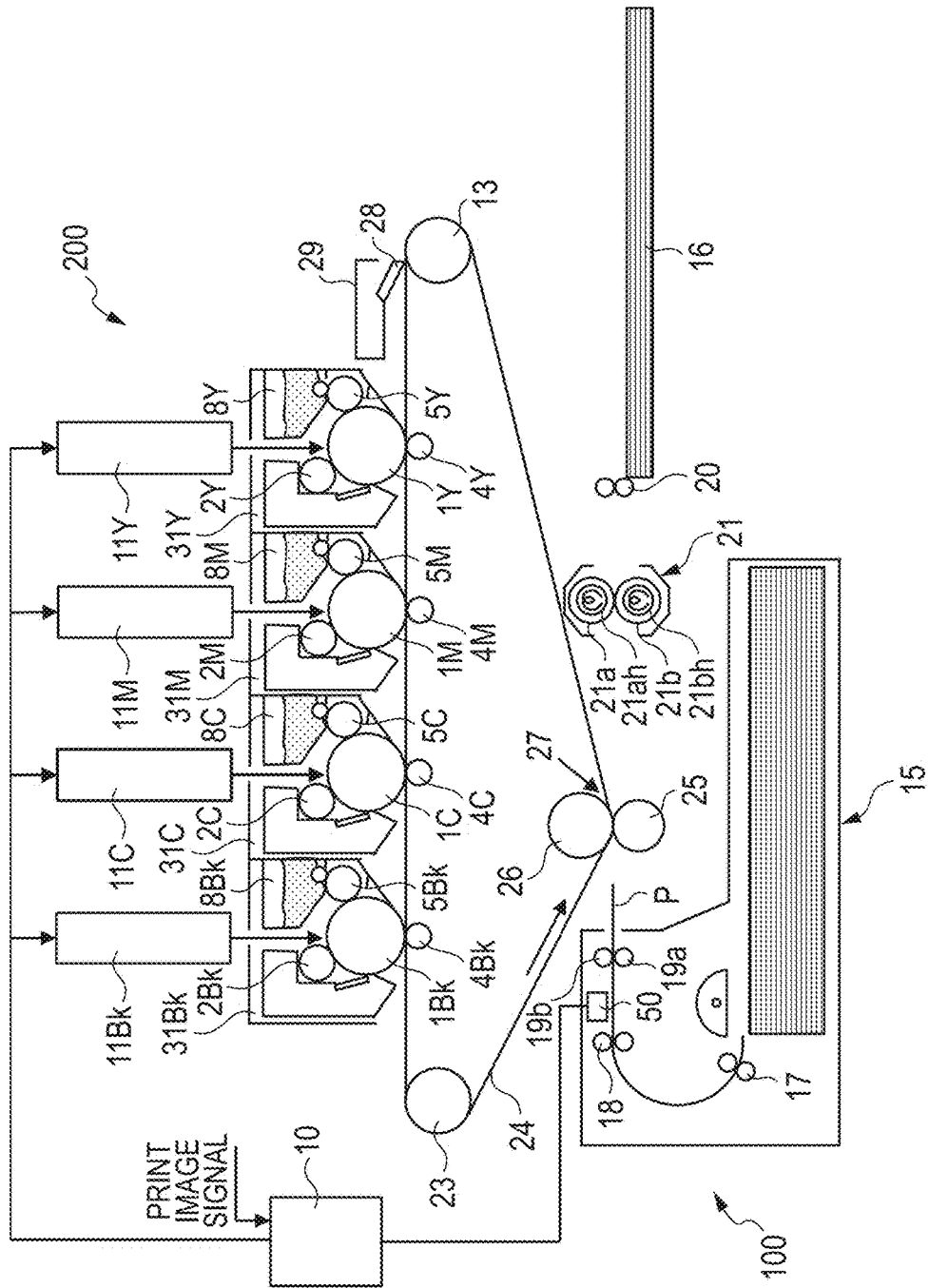
FIG. 9 is a sub-scanning sectional view of main portions of an image forming apparatus having the discriminating device according to the first or second embodiment mounted thereon.

FIG. 9 is a sub-scanning sectional view of main portions of an image forming apparatus 200 having a discriminating device 100 according to the first or second embodiment mounted thereon.

The image forming apparatus 200 is a tandem type color image forming apparatus adopting an intermediate transfer belt.

The image forming apparatus 200 includes photosensitive members (photosensitive drums) 1Y, 1M, 1C, and 1Bk for stations of respective colors of yellow (Y), magenta (M), cyan (C), and black (Bk), and charging rollers 2Y, 2M, 2C, and 2Bk. Further, the image forming apparatus 200 includes primary transfer rollers 4Y, 4M, 4C, and 4Bk, and developing devices 8Y, 8M, 8C, and 8Bk. Further, the image forming apparatus 200 includes a controller 10, light scanning apparatuses 11Y, 11M, 11C, and 11Bk, a tension roller 13, a feeder 15, a discharge tray 16, discharge rollers 20, a fixing device 21, and a drive roller 23. Further, the image forming apparatus 200 includes an intermediate transfer belt 24, a secondary transfer roller 25, a secondary transfer counter roller 26, a cleaner 28, a cleaner container 29, toner cartridges 31Y, 31M, 31C, and 31Bk, and the discriminating device 100.

The photosensitive drums 1Y, 1M, 1C, and 1Bk each have an organic light conducting layer applied to an outer periphery of an aluminum cylinder. The photosensitive drums 1Y, 1M, 1C, and 1Bk each rotate in a clockwise direction in FIG. 9 in accordance with an image forming operation when receiving a drive force of a drive motor (not shown).

The intermediate transfer belt 24 is held in abutment against the photosensitive drums 1Y, 1M, 1C, and 1Bk, and rotates in a counterclockwise direction in synchronization with the rotation of the photosensitive drums 1Y, 1M, 1C, and 1Bk at a time of color image formation.

The fixing device 21 is configured to melt and fix a transferred multi-color toner image on the recording material P while conveying the recording material P. As illustrated in FIG. 9, the fixing device 21 includes a fixing roller 21a configured to heat the recording material P and a pressure roller 21b configured to bring the recording material P into pressure contact with the fixing roller 21a. The fixing roller 21a and the pressure roller 21b are each formed in a hollow shape, and include heaters 21ah and 21bh, respectively.

When the controller 10 receives an image signal from an external apparatus (not shown), the recording material (transfer material) P is fed from the feeder 15 to the image forming apparatus 200 by feeding rollers 17 and 18. After that, the recording material P is temporarily sandwiched by a roller-shaped synchronous rotary member for synchronizing the image forming operation described later with the conveyance of the recording material P, that is, a conveyance roller pair 19a and 19b formed of a conveyance (registration) roller 19a and a conveyance (registration) counter roller 19b, and is stopped to be brought into a standby state.

Further, in accordance with the received image signal, the controller 10 causes the light scanning apparatuses (exposure devices) 11Y, 11M, 11C, and 11Bk to form electrostatic latent images on surfaces (photosensitive surfaces) of the photosensitive drums 1Y, 1M, 1C, and 1Bk each charged to a certain potential through action of the charging rollers 2Y, 2M, 2C, and 2Bk, respectively.

Then, the developing devices 8Y, 8M, 8C, and 8Bk visualize, that is, develop the electrostatic latent images formed on the surfaces of the photosensitive drums 1Y, 1M, 1C, and 1Bk, respectively.

The developing devices 8Y, 8M, 8C, and 8Bk include sleeves 5Y, 5M, 5C, and 5Bk, respectively, and are each supplied with a developing bias for visualizing the electrostatic latent image.

Thus, the electrostatic latent images formed on the surfaces of the photosensitive drums 1Y, 1M, 1C, and 1Bk are each developed as a monochromatic toner image through action of the developing devices 8Y, 8M, 8C, and 8Bk, respectively.

The photosensitive drums 1Y, 1M, 1C, and 1Bk, the charging rollers 2Y, 2M, 2C, and 2Bk, and the developing devices 8Y, 8M, 8C, and 8Bk have integrated configurations, respectively, and are mounted on the image forming apparatus 200 as toner cartridges 31Y, 31M, 31C, and 31Bk capable of being detached from a main body of the image forming apparatus 200.

Next, the developed monochromatic toner images are successively transferred onto the intermediate transfer belt (transferring device) 24 through action of the respective primary transfer biases applied to the primary transfer rollers (transferring devices) 4Y, 4M, 4C, and 4B, with the result that a multi-color toner image is formed on the intermediate transfer belt 24.

Then, the multi-color toner image formed on the intermediate transfer belt 24 is conveyed to a secondary transfer nip portion (transferring device) 27 formed of the secondary transfer roller 25 and the secondary transfer counter roller 26.

Simultaneously with this, the recording material P that has been brought into a standby state under a state of being sandwiched by the conveyance roller pair 19a and 19b is conveyed to the secondary transfer nip portion 27 in synchronization with the multi-color toner image on the intermediate transfer belt 24 through action of the conveyance roller pair 19a and 19b.

Thus, the multi-color toner image on the intermediate transfer belt 24 is transferred at once onto the recording material P at the secondary transfer nip portion 27 through action of a secondary transfer bias applied to the secondary transfer roller 25.

Then, the recording material P holding the multi-color toner image is conveyed by the fixing roller 21a and the pressure roller 21b, which form the fixing device 21, and is supplied with heat and a pressure, with the result that the multi-color toner image is fixed to the surface of the recording material P.

The recording material P having the toner image fixed thereto is discharged to the discharge tray 16 by the discharge rollers 20, and the image forming operation is completed.

Then, the cleaner 28 cleans a transfer residual toner remaining on the intermediate transfer belt 24, and the collected transfer residual toner is stored in the cleaner container 29 as a waste toner.

The above-mentioned series of the image forming operations is controlled by the controller 10 arranged in the image forming apparatus 200.

In the image forming apparatus 200, the discriminating device according to the first or second embodiment is arranged as the discriminating device 100 configured to discriminate the type of the recording material P.

The discriminating device 100 is arranged on an upstream side of the conveyance roller pair 19a and 19b in a recording material conveyance direction, and is capable of detecting information reflecting the surface smoothness of the recording material P conveyed from the feeder 15.

The discriminating device 100 performs discrimination while the recording material P is fed from the feeder 15 to the image forming apparatus 200 and is stopped under a state of being sandwiched by the conveyance roller pair 19a and 19b.

Then, the controller 10 performs an operation of controlling the image forming apparatus 200 by setting optimum image forming conditions, for example, a transfer bias and a fixing temperature, based on discrimination information (discrimination results) on the type of the recording material P sent from the discriminating device 100.

According to the present invention, it is possible to provide the discriminating device in which high discrimination accuracy is achieved by appropriately setting parallelism of the plurality of light beams caused to enter the recording material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-093752, filed May 10, 2017, which is hereby incorporated by reference herein in its entirety.

What is claimed is:

1. A discriminating device, comprising:
   a light guiding member configured to guide a plurality of light beams from a first light source to an irradiated surface;
   an image pickup element configured to receive a light beam from the irradiated surface; and
   an optical system configured to focus the light beam from the irradiated surface to the image pickup element,
   wherein the light guiding member guides a plurality of first light beams from the first light source to a first effective region of the irradiated surface, and guides a plurality of second light beams from the first light source to a second effective region of the irradiated surface, wherein the plurality of first light beams form an angle of 7° or less with each other within a first cross section parallel to the irradiated surface, wherein the plurality of second light beams form an angle of 7° or less with each other within the first cross section, wherein an average value of incident angles of the plurality of first light beams with respect to the irradiated surface is 70° or more, and wherein a difference between an average value of incident angles of the plurality of first light beams with respect to the irradiated surface and an average value of incident angles of the plurality of second light beams with respect to the irradiated surface is between 80° and 110° inclusive when the plurality of first light beams and the plurality of second light beams are projected to the irradiated surface.

2. A discriminating device according to claim 1, further comprising a discriminator configured to discriminate an object arranged on the irradiated surface based on output from the image pickup element.

3. A discriminating device according to claim 1, wherein the image pickup element includes a plurality of photoelectric conversion elements arranged in a first direction parallel to the irradiated surface.

4. A discriminating device according to claim 3, wherein an average value of incident angles of the plurality of first light beams with respect to the irradiated surface and the first direction is between 35° and 55° inclusive when the plurality of first light beams are projected to the irradiated surface.

5. A discriminating device according to claim 3, wherein an average value of incident angles of the plurality of second light beams with respect to the irradiated surface and the first direction is between 125° and 145° inclusive when the plurality of second light beams are projected to the irradiated surface.

6. A discriminating device according to claim 1, wherein the light guiding member includes a concave-shaped reflection surface.

7. A discriminating device according to claim 6, wherein the concave-shaped reflection surface is configured to totally reflect the plurality of light beams.

8. A discriminating device according to claim 6, wherein the concave-shaped reflection surface is an optical surface, closest to the irradiated surface, in the light guiding member.

9. A discriminating device according to claim 1, wherein the light guiding member includes an optical surface configured to regulate the plurality of light beams.

10. A discriminating device according to claim 1, wherein the light guiding member includes an optical surface closest to the irradiated surface, the optical surface being a flat surface.

11. A discriminating device according to claim 6, wherein the concave-shaped reflection surface is an optical surface arranged at the first light source side of an optical surface closest to the irradiated surface in the light guiding member.

12. A discriminating device according to claim 1, wherein the plurality of first light beams form angles with a difference of 6° or less therebetween with respect to the irradiated surface.

13. An image forming apparatus, comprising:
the discriminating device of claim 1;
an exposure device configured to form an electrostatic latent image on a photosensitive surface;
a developing device configured to develop the electrostatic latent image as a toner image;
a transferring device configured to transfer the developed toner image onto a transfer material; and
a fixing device configured to fix the transferred toner image to the transfer material.

14. An image forming apparatus according to claim 13, further comprising a controller configured to set an image forming condition in accordance with a discrimination result obtained by the discriminating device.

15. An image forming apparatus according to claim 13, wherein the first effective region is included in a surface of the transfer material onto which the toner image is to be transferred, and wherein an average value of incident angles of the plurality of first light beams with respect to the irradiated surface and a conveyance direction of the transfer material is between 35° and 55° inclusive when the plurality of first light beams are projected to the irradiated surface.

16. A discriminating device, comprising:
a light guiding member configured to guide a plurality of light beams from first and second light sources to an irradiated surface;
an image pickup element configured to receive a light beam from the irradiated surface; and
an optical system configured to focus the light beam from the irradiated surface to the image pickup element,
wherein the light guiding member guides a plurality of first light beams from the first light source to a first effective region of the irradiated surface, and guides a plurality of second light beams from the second light source to a second effective region of the irradiated surface,
wherein the plurality of first light beams form an angle of 7° or less with each other within a first cross section parallel to the irradiated surface,
wherein the plurality of second light beams form an angle of 7° or less with each other within the first cross section,
wherein an average value of incident angles of the plurality of first light beams with respect to the irradiated surface is 70° or more, and
wherein a difference between an average value of incident angles of the plurality of first light beams with respect to the irradiated surface and an average value of incident angles of the plurality of second light beams with respect to the irradiated surface is between 80° and 110° inclusive when the plurality of first light beams and the plurality of second light beams are projected to the irradiated surface.

17. A discriminating device, comprising:
a light guiding member configured to guide a plurality of light beams from a first light source to an irradiated surface;
an image pickup element configured to receive a light beam from the irradiated surface; and
an optical system configured to focus the light beam from the irradiated surface to the image pickup element,
wherein the light guiding member guides a plurality of first light beams from the first light source to a first effective region of the irradiated surface, and guides a plurality of second light beams from the first light source to a second effective region of the irradiated surface, wherein the plurality of first light beams form an angle of 7° or less with each other within a first cross section parallel to the irradiated surface, wherein the plurality of second light beams form an angle of 7° or less with each other within the first cross section, wherein an average value of incident angles of the plurality of first light beams with respect to the irradiated surface is 70° or more, and wherein an average value of incident angles of the plurality of first light beams with respect to the irradiated surface and the first direction is between 35° and 55° inclusive when the plurality of first light beams are projected to the irradiated surface.

* * * * *